US 12,149,653 B2

(12) United States Patent
Xu et al.

(10) Patent No.: US 12,149,653 B2
(45) Date of Patent: Nov. 19, 2024

(54) SMART SCREEN ROTATION BASED ON FACIAL ANALYSIS

(71) Applicant: Citrix Systems, Inc., Fort Lauderdale, FL (US)

(72) Inventors: Sai Xu, Nanjing (CN); Qin Zhang, Nanjing (CN); Rui Zhang, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 493 days.

(21) Appl. No.: 17/335,424

(22) Filed: Jun. 1, 2021

(65) Prior Publication Data
US 2022/0368793 A1 Nov. 17, 2022

Related U.S. Application Data

(63) Continuation of application No. PCT/CN2021/093678, filed on May 13, 2021.

(51) Int. Cl.
*H04M 1/72454* (2021.01)
*G06F 3/01* (2006.01)

(52) U.S. Cl.
CPC ........ *H04M 1/72454* (2021.01); *G06F 3/013* (2013.01); *H04M 2250/12* (2013.01)

(58) Field of Classification Search
CPC .......... H04M 1/72454; H04M 2250/12; G06F 3/013
See application file for complete search history.

(56) References Cited

U.S. PATENT DOCUMENTS

| 2016/0077592 | A1* | 3/2016 | Bhesania | G06F 3/013 345/650 |
| 2017/0264891 | A1* | 9/2017 | Iwasaki | H04N 13/373 |
| 2019/0156460 | A1 | 5/2019 | Rhodes et al. | |
| 2020/0104033 | A1 | 4/2020 | Ho et al. | |

FOREIGN PATENT DOCUMENTS

| CN | 106303029 A | | 1/2017 | |
| CN | 106303029 B | * | 6/2019 | ............... G06F 3/14 |
| EP | 2428864 A2 | | 3/2012 | |

OTHER PUBLICATIONS

Nov. 10, 2021—(WO) International Search Report and Written Opinion—App PCT/CN2021/093678.

* cited by examiner

*Primary Examiner* — Amal S Zenati

(57) ABSTRACT

Methods and systems for rotating elements displayed by computing devices are described herein. At least one image of a user of a computing device may be captured by a camera of the computing device. An angle of the eyes of the user with respect to the computing device may be determined. Based on that determined angle, at least one element of content displayed by the computing device may be rotated so as to allow for display of that element in an orientation consumable by the user. For example, the element might be rotated at an angle corresponding to the angle of the eyes of the user with respect to the orientation of the computing device.

19 Claims, 9 Drawing Sheets

SMART SCREEN ROTATION BASED ON FACIAL ANALYSIS

CROSS-REFERENCE TO RELATED APPLICATION

This application is a Continuation of PCT/CN2021/093677, filed May 13, 2021, the content of which is hereby incorporated by reference into the present application.

FIELD

Aspects described herein generally relate to portable computing devices and hardware and software related thereto. More specifically, one or more aspects describe herein provide for display of content on computing devices, such as handheld computing devices.

BACKGROUND

Users may interact with computing devices, including handheld computing devices such as a smartphone, in a variety of ways. A user might physically rotate or otherwise move a computing device in such a manner that causes the computing device to rotate content displayed by a display device. For example, a user might rotate their smartphone ninety degrees, and the smartphone might, in response to this rotation, switch its display from a portrait mode to a landscape mode. Some computing device operating systems might permit a user to manually control this display rotation. For example, some operating systems permit a user to indicate that one monitor is rotated ninety degrees, which might cause the operating system to rotate content on that screen in a portrait mode. As another example, some operating systems permit a user to lock display of content to a portrait mode and/or a landscape mode.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

It is not uncommon for many users to begin and end their day by using their phone in bed, when laying on a couch, and/or when otherwise relaxing. In such circumstances, the positioning of the computing device relative to the user might vary widely, which makes content on the computing device difficult to see and interact with: for example, if a user is looking at a smartphone sitting on a table, then the phone might be rotated with respect to the user such that reading content on the smartphone might be difficult. Many computing devices try to address this issue by using an accelerometer to determine a tilt with respect to gravity (and, e.g., using that tilt to determine whether the device should display in a portrait or landscape mode); however, such approaches do not fully account for the position of the user relative to the device and thus might be unhelpful. For example, a user might rest on their side, but the device might display content in a manner which assumes the user is seated or standing upright. After all, if a user is laying down on a couch and holds their smartphone in a portrait or otherwise vertical orientation relative to their face, their smartphone might nonetheless switch to a landscape mode because the sensors of the smartphone detect a change in the orientation of the device (e.g., detect a change in respect to angular velocity). As another example, the user might lay their device flat on a table, but the table might be slightly tilted, causing the device to shift from a portrait mode to a landscape mode (or vice versa) without being intentionally tilted to do so. Some users might manually control the mode (e.g., portrait or landscape mode) of the device in order to proactively address this issue; however, such a process can be repetitive and time-consuming. Furthermore, such actions may not possible for small degrees of tilt by a user (e.g., movement less than ninety degrees) because many devices today lack the ability to make granular adjustments (or in a manner of degrees) in the display of content to compensate for small changes in device orientation. In short, devices today provide content either in portrait or landscape mode with no options in between. Thus, present technologies provide an all-or-nothing proposition for display of content that degrades the user experience of mobile devices.

To overcome limitations described above, and to overcome other limitations that will be apparent upon reading and understanding the present specification, aspects described herein are directed towards rotating elements displayed in a user interface of a portable or computing device based on analysis of a face of a user of the computing device.

As will be described further herein, a computing device may capture, using a camera, one or more images of a user of the computing device. Capturing the one or more images may be responsive to execution of an application on the computing device. The computing device may send, via an operating system, a request for permission to capture the one or more images of the user, and capturing the one or more images may be based on a user response to the request. The computing device may detect, using one or more facial recognition algorithms, a face of the user in the one or more images. The computing device may determine, based on the detected face of the user in the one or more images, an angle of eyes of the user with respect to an orientation of the computing device. The angle of the eyes may be determined by determining a first line representing a relationship of a first eye of the user and a second eye of the user, determining a second line representing orientation of the computing device, and comparing the first line and the second line. The angle of the eyes may additionally and/or alternatively be determined using a plurality of captured images of the user, such that determining the angle comprises comparing each of the plurality of images of the user to determine an average angle of the eyes of the user. The computing device may then rotate, based on determining that the angle of the eyes of the user with respect to the orientation of the computing device satisfies a threshold, an element displayed in a user interface provided by the computing device. Rotating the at least one element may comprise displaying an application in one of: a portrait mode, or a landscape mode. Rotating the at least one element may additionally and/or alternatively comprise rotating the at least one element less than 45 degrees. Rotating the at least one element may further be based on a measurement from a multi-axis accelerometer. In this manner, at least one element of content displayed by a computing device may be rotated so as to allow for display of that element in an orientation consumable by the user.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards improving the way in which computing devices (e.g., handheld computing devices) display content. The increasing popularity of computing devices has led those devices to be used in a variety of circumstances: for example, many users often bring their smartphones to bed and use them before falling asleep. Under such circumstances, the computing devices might display content in a manner which makes it difficult for the user to enjoy that content. For example, a user might lay down on a couch and try to use their smartphone in a portrait mode (that is, the user might lay down horizontally and rotate their smartphone ninety degrees to be in a portrait mode from their perspective), but—due to the force of gravity—the smartphone might display content in a landscape mode. Aspects described herein remedy this issue by using facial recognition techniques to analyze an angle of a user's eyes, then using that information to rotate one or more display elements. This process thereby improves the manner in which content is displayed by a computing device. After all, by rotating elements based on a tilt of a user's face, the system can display content (e.g., rotate displayed content) in a manner which makes the content significantly easier for the user to see and understand. This process is also significantly more nuanced than simply deciding whether content should be displayed in a portrait or landscape mode: by dynamically rotating content based on an orientation of the user, a finer degree of rotation (e.g., at angles less than ninety degrees) might be accomplished.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Figure 1:
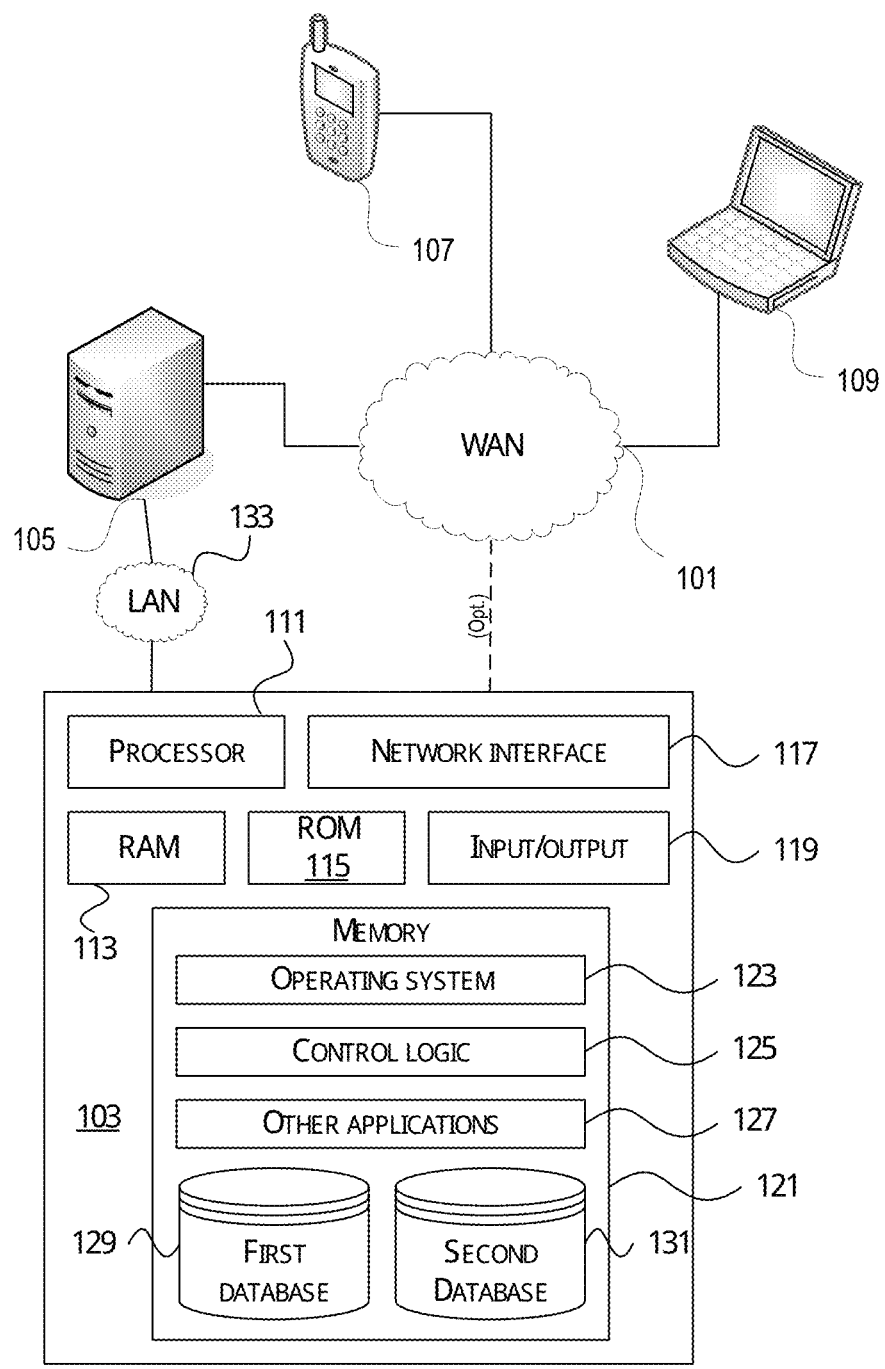
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Rotation of Computing Device Display

Discussion will now turn to various illustrations of use cases of a computing device with respect to a user.

Figure 2A:
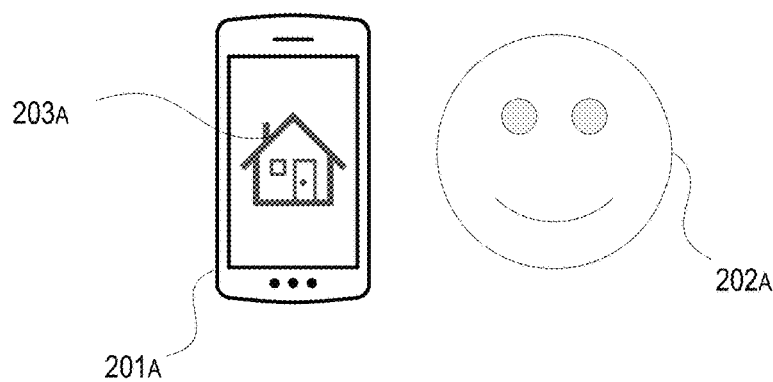
FIG. 2A depicts a computing device oriented in a portrait orientation with a user standing.

FIG. 2A shows a user 202a standing and holding a computing device 201a in a vertical position, with a display 203a shown displayed in a portrait mode (i.e., display of content being taller than it is wide). For simplicity purposes, FIG. 2A (and subsequent FIGS. 2B-2E) is hyper-simplified, showing only the orientation of the face of the user 202a and the orientation of the computing device 201a, both facing the reader rather than (as might be more common) facing each other. The computing device 201a may be the same or similar as any one of the devices 103, 105, 107, 109 of FIG. 1. For example, the computing device 201 may be a smartphone, tablet, or the like. This image depicts a conventional use of a smartphone or tablet: specifically, one where the computing device 201a is, like the user 202a, substantially vertical.

Figure 2B:
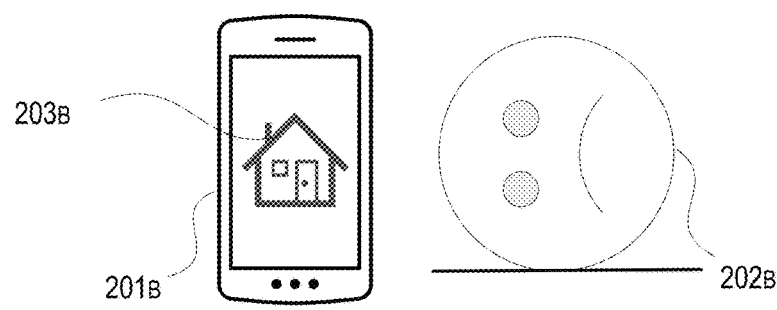
FIG. 2B depicts a computing device oriented in a portrait orientation with a user laying down.

FIG. 2B depicts an unsatisfactory use case for a computing device 201b, where a user 202b is laying down but a display 203b is still displayed in portrait mode. Such a circumstance might arise because the computing device 201b might be configured to rotate display of elements based on a change in device orientation. In other words, FIG. 2B depicts a circumstance where the user 202b changes position relative to the computing device 201b, but the device itself has not changed position.

Figure 2C:
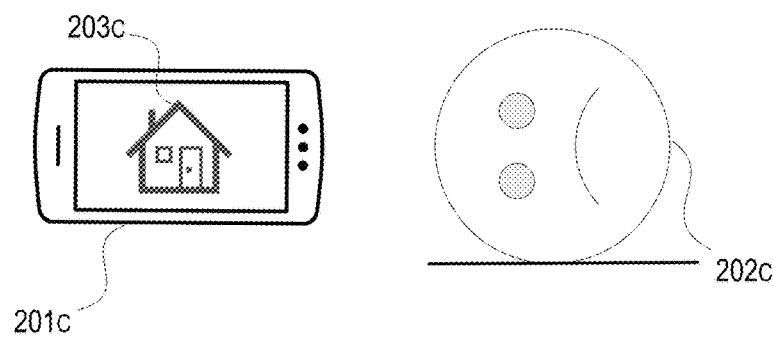
FIG. 2C depicts a computing device oriented in a landscape orientation with a user laying down.

FIG. 2C depicts another unsatisfactory use case for a computing device 201c, where a user 202c is laying down, the computing device 201c has been rotated ninety degrees, but a display 203c is now displayed in a landscape mode (i.e., display of content being wider than it is tall) As can be seen, in such an instance, the display 203c has not rotated. This sort of circumstance might arise after the circumstance depicted in FIG. 2B, where a user might try to correct the improper orientation of a user element by rotating their computing device. This circumstance might cause the user to go into the settings menu of the device 201c to manually modify the display settings to display content in portrait mode. Such manual actions are often very inconvenient, as—after the user is no longer laying down—the user might have to then go back and manually switch back on an auto-rotating functionality.

In the circumstances depicted in both FIG. 2B and FIG. 2C, enjoyment of content provided by a computing device might be significantly impaired by the improper orientation of that content. For example, the circumstance depicted in FIG. 2C might make it difficult for the user 202c to read text content, particularly if the user has reading difficulties. As another example, the circumstance depicted in FIG. 2C might make it difficult for the user 202c to enjoy a game, as the improper orientation of various elements might make it difficult for the user to reach and interact with elements on a touchscreen.

Figure 2D:
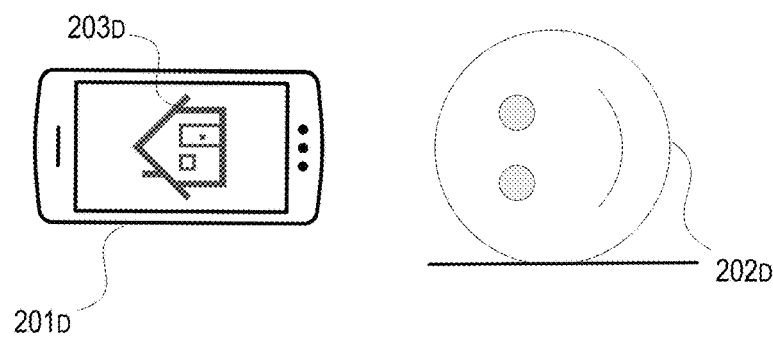
FIG. 2D depicts a computing device oriented in a landscape orientation with a user laying down, with a display element rotated such that the computing device is displaying content in a portrait orientation.

FIG. 2D depicts a better use case for a computing device 201d, where a user 202d is laying down, the computing device 201d has been rotated ninety degrees, and a display 203d is shown also rotated ninety degrees, such that display remains in a portrait mode. This is often an ideal circumstance for the consumption of content on a computing device like the computing device 201d, because the content is orientated in a fashion that is familiar and natural to users to allow them to more easily consume or interact with the content. This is particularly true for handheld or portal devices, for which their design and normal manner of use of is in portrait mode.

The relationship between the user 202d, the computing device 201d, and the display 203d in FIG. 2D represents a circumstance where at least one element of content displayed by a computing device has been rotated so as to allow for display of that element in an orientation consumable by the user. Content might be consumable by a user in that it is displayed, relative to the user, in an orientation in which the reader can read, interact with, or otherwise understand the content being displayed. For example, English text might be readily consumable if it is displayed in a left-to-right orientation, but might be significantly more difficult to consume for a user if it is upside-down. As another example, a user interface comprising a virtual directional pad might be consumable by the user if the direction corresponding to left on the virtual directional pad is always pointing to the left of the user.

The display 203a, the display 203b, the display 203c, and the display 203d, might be part of a computing device, such as any one of the devices 101, 103, 105, 107 and/or any one of the computing devices 201a, 201b, 201c, 201d. As will be described in further detail herein, all content displayed by a display might be rotated, or individual display elements of a display might be rotated. Such display elements might comprise portions of a user interface (e.g., text content, buttons, input boxes, or the like), graphical content (e.g., images, video), or the like. For example, a computing device might be configured to rotate only certain user interface elements (e.g., text but not a background image), and/or the computing device might be configured to rotate the entirety of a display (e.g., rotate all content displayed by a display device). A computing device might display one large display element (e.g., a video that takes up the entirety of a screen) and/or might display a plurality of display elements (e.g., different elements which collectively form a user interface).

While FIG. 2D depicts an orientation of the display 203d which might, for example, make text easier to read, there may be circumstances in which rotation of an element might be undesirable regardless of the positioning of a user device. For example, if a computing device is displaying a movie at a 16:9 aspect ratio, then display of the movie in landscape mode might be ideal, as otherwise substantial portions of the display of the computing device might go unused. The nature of the application(s) being executed by a computing device and/or user preferences might govern such circumstances. For example, a video player application might be configured to always provide output in a landscape mode, whereas an e-mail application might be configured to rotate such that the text is always displayed in a horizontal fashion relative to a user's eyes.

Figure 2E:
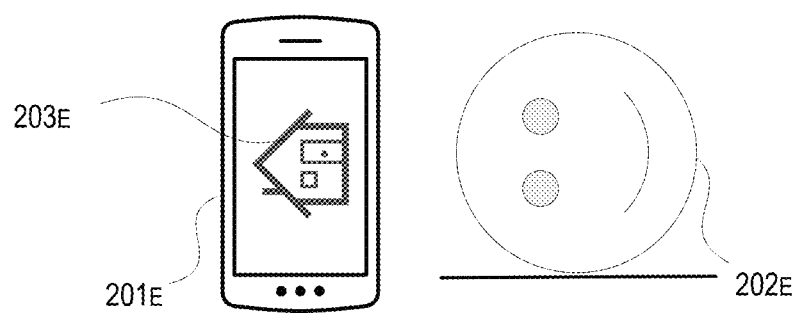
FIG. 2E depicts a depicts a computing device oriented in a portrait orientation with a user laying down, with a display element rotated such that the computing device is displaying content in a landscape orientation.

FIG. 2E depicts another better use case for a computing device 201e where a user 202e is laying down, the computing device 201e is held in a portrait mode, and a display 203e is shown also rotated ninety degrees, such that display is in a landscape mode. Like FIG. 2D, FIG. 2E depicts a circumstances where the computing device 201e has rotated the display 203e based on the orientation of the user 202e, rather than the positioning of the computing device 201e. As such, FIG. 2E represents another circumstance where at least one element of content displayed by a computing device has been rotated so as to allow for display of that element in an orientation consumable by the user.

Discussion will now turn to a manner in which the angle of a user's eyes might be used to effectuate the rotation of display and/or elements thereof.

Figure 3:
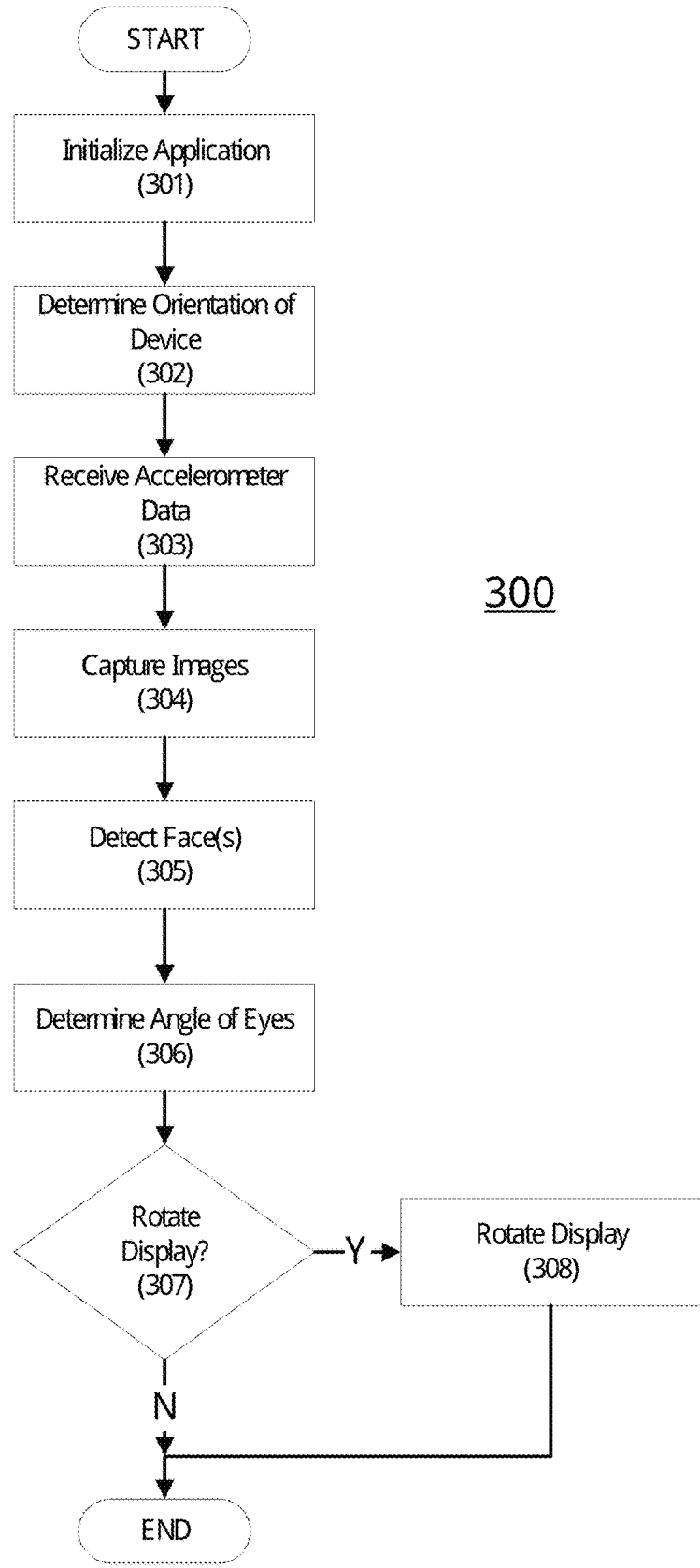
FIG. 3 is a flowchart depicting steps for rotating elements displayed by a computing device.

FIG. 3 is a flowchart comprising steps for a method 300 which might be executed by a computing device. For example, the steps depicted in FIG. 3 might be performed by any one of the devices 101, 103, 105, 107 and/or any one of the computing devices 201a, 201b, 201c, 201d. Additionally and/or alternatively, computer-readable media may store instructions that, when executed by a computing device, cause performance of one or more of the steps of the method 300. Many of the steps of FIG. 3 are illustrative, and might be omitted, re-arranged, and/or otherwise modified as desired. For example, step 303 might be entirely omitted, and/or step 302 might be performed after step 306.

In step 301, an application might be initialized by the computing device. Initialization of an application might comprise executing an application on the computing device, opening an already-executing application on the computing device, or the like. The application might comprise one or more display elements that collectively make-up a graphical user interface in which the user interacts with the application. The application might comprise an e-mail application, and the one or more display elements might comprise various portions of a user interface for browsing and reading e-mails. The application might comprise a chess game, and the one or more display elements might comprise a chess board, various chess pieces, and other portions of a user interface.

In step 302, an orientation of a computing device (e.g., a handheld or otherwise portable computing device) may be determined. The orientation of the computing device might correspond to any positioning of the computing device in three-dimensional space. For example, the computing device might be lying flat on a table, standing upward in a portrait mode, rotated on its side in a landscape mode, or the like. The orientation of the computing device might be determined using measurements from sensors of the computing device, such as a multi-axis accelerometer or gyro-sensors. For example, the orientation of the computing device might be determined based on a direction of gravity determined using a multi-axis accelerometer.

In step 303, data generated by sensors of the computing device might be received. Sensor data might comprise any information regarding motion of a computing device, such as motion of the computing device over time. The data might additionally and/or alternatively indicate how the computing device moved to be in the orientation determined in step 302. In comparison to the orientation of the computing device (as determined in step 302, above), the sensor data might indicate motion that might affect the orientation of the computing device. For example, the data might indicate that the computing device was recently rotated from a portrait orientation to a landscape orientation. As another example, the sensor data might indicate that the computing device has remained still (and in a particular orientation) for a period of time. As yet another example, the data might indicate that the computing device has been dropped, such that display should not change (as, after all, any possible changes in orientation might have been inadvertent and the result of dropping the computing device).

An example of steps 302 and 303 that helps illustrate the distinction between the orientation of the computing device and the sensor data, though both might be received from the same or a similar source (e.g., a multi-axis accelerometer). As part of step 302, a computing device might use one or more sensors (e.g., an accelerometer) to determine an orientation of the computing device (e.g., a current orientation of the computing device in three-dimensional space). Then, as part of step 303, the computing device might receive sensor data indicating one or more movements of the computing device over a period of time. For example, one of those movements could have been a rotation of the computing device from a vertical orientation (i.e., a portrait perspective) to a horizontal orientation (i.e., a landscape perspective). As another example, a possible movement of the device could be hinge-like motion along one side of the computing device, suggesting that it is being held by a user along that side. The orientation of the computing device might indicate a current three-dimensional orientation of the computing device, but the accelerometer data might provide contextual information about how the computing device reached that orientation. For example, if the accelerometer data indicates that the computing device was jostled or otherwise dropped, this might indicate that the orientation of the computing device is inadvertent, and that rotation of various display elements (e.g., as displayed later, in steps 307 and 308) should not occur.

In step 304, the computing device might receive one or more images. These images, in some examples, can be generated and provided by an image capture device (e.g., a camera) of the computing device. The one or more images might be captured responsive to initiation or execution of an application, such as the application initialized in step 301, executable on or otherwise accessible via the computing device. The one or more images may include one or more portions of a user of a computing device. For example, the camera may be a front-facing camera on a smartphone, and the camera may take one or more pictures of a user of the smartphone. In some circumstances, it may be desirable to take a plurality of different images and/or a video. In this manner, changes to the user (e.g., movement of the user, such as shuffling around as they lay down on a couch) might be detected. The detection of changes t of the user might be based on analyzing a background behind a user. For example, the one or more images might show a background behind a face of a user changing, suggesting that the user might be moving around (e.g., standing up, sitting down, walking around). As another example, small changes to a background behind a face of a user might indicate that the user is shuffling around or moving naturally, such that a display of a computing device should not change (as, for example, the user might just be getting more comfortable, and changing display of interface elements every time the user moves might be undesirably jarring). To detect the background of a user, one or more facial recognition techniques might be executed to isolate and remove a user's face from one or more images, and the remaining content (e.g., portions of the images corresponding to an environment of the user) might be analyzed. Capturing multiple images might advantageously also allow the system to better detect a user's face, as will be described in further detail below.

Because capturing images of a user might be invasive, capturing the one or more images using the camera might be conditioned on user permission. For example, an operating system of the computing device might be used to send a request for permission to capture one or more images of the user, and capturing the one or more images might be based on a user response to the request. After the images are used (e.g., in steps 305 and 306, discussed below), the images might be automatically deleted to preserve a privacy of the user. In this manner, the user's image might be used to improve display of content, but the user may be assured that potentially unflattering or compromising images will not be stored or otherwise available.

In step 305, based on the captured one or more images, one or more faces might be detected. The one or more faces might be detected using one or more facial recognition techniques. For example, approach include detection of a left eye of a user, whereas an approach detects a right eye of a user. Other approaches might detect face-like objects (e.g., an oval, a substantially round shape, a continuous shape comprising mostly of skin tones, or the like), while others might identify facial features (e.g., eyes, a nose, a mouth) within those shapes. The output of such approaches may comprise coordinates, in the one or more images, of one or more eyes relative to the computing device. Based on those coordinates, an orientation of the eyes of a user might be determined. For example, one approach might provide a plurality of coordinates, wherein each set of coordinates corresponds to an approximate orientation of an eye in an image relative to the computing device.

In step 306, an angle of the eyes of a user might be determined. The angle of the eyes might correspond to an orientation of the eyes, with respect to each other, in the one or more images. To determine this angle, a line might be drawn from one eye of a user to another eye of a user, and that line might be used to determine an angle. For example, if a user is looking directly at a smartphone in a portrait mode, the eyes might appear to be substantially horizontal. As another example, if the user is laying down but the smartphone remains standing upright, the user's eyes might appear to be substantially vertical. As yet another example, if the user rotates a smartphone at an angle, then the user's eyes might appear to be in a line based on that angle.

Multiple images might be used to determine the angle of the eyes of the user. For example, a camera might capture five images of a user over a one-second period, and those five images might be individually processed using one or more facial recognition techniques to determine eye coordinates. Then, an angle of the eyes of the user might be determined in each image, and an average angle of the eyes of the user might be determined. The use of the average angle of the eyes of the user might be particularly useful where the images captured of the user might be unreliable and/or otherwise inconsistent. For example, a user might be walking and using their computing device, such that one or more of the images might be slightly blurry. By using the average angle of the eyes, potential inconsistencies and/or inaccuracies relating to the blurriness might be avoided.

In step 307, the computing device might determine whether to rotate display. Determining whether to rotate the display might be based on the angle of the eyes of the user with respect to the orientation of the computing device. For example, a threshold (e.g., forty-five degrees) might be set, and the display might be rotated based on the angle of the eyes of the user with respect to the orientation of the computing device satisfying that threshold. Determining whether to rotate the display might be based on the sensor data (e.g., accelerometer data). For example, if a computing device was dropped, even if the angle did satisfy a threshold, the display might not be rotated because the motion of the computing device may have been recognized or otherwise determined as being inadvertent. As another example, if the computing device was recently and deliberately turned ninety degrees, this might indicate that the user recently laid down (e.g., on a couch), and the display may or might not be rotated. Determining whether to rotate the display might be based on user preferences and/or application preferences. For example, a user might input preferences as to which circumstances (e.g., which applications and eye angles) should cause rotation of the display. As another example, applications might specify which displays of the application should rotate under certain circumstances, and/or might specify whether the entirety of the output of the application should rotate under certain circumstances.

Determining whether to rotate a display of content might comprise comparing the angle of the eyes of the user relative to the computing device with a threshold. A threshold might be determined such that small movements of the user and/or the computing device do not result in unexpected and/or undesirable rotation of the one or more display elements. For example, a user might naturally make small motions while reading content on their smartphone, and it might be undesirable to modify display of that content while the user reads it. The threshold might be based on an angle (e.g., ten degrees), a time period (e.g., ten seconds since the last rotation of one or more display elements), or the like.

Comparing the angle of the eyes of the user relative to the orientation of the computing device might comprise comparing a line representing a relationship between the eyes of a user to a line representing an orientation of the computing device. For example, as described above with respect to step 306, a first line might be determined that represents a relationship of a first eye of a user and a second eye of a user. Then, a second line might be determined representing the center line of a computing device. In circumstances where the computing device is rectangular, the line might represent a line in the center of the device. The angle might then be determined by comparing the first line and the second line. For example, the angle of the first line (e.g., ten degrees) might be subtracted from an angle of a second line (e.g., thirty degrees) to determine a difference (e.g., twenty degrees) between at tilt of a user's eyes and an orientation of the computing device. The display and/or display elements might be rotated based on this difference (e.g., rotated twenty degrees). This comparison is illustrated in, for example, FIGS. 4A-4C, discussed below.

If the answer to step 307 is no, then the method 300 ends. Otherwise, the method 300 proceeds to step 308.

In step 308, the display might be rotated. Rotating the display might comprise rotating the display at an angle based on the angle of the eyes of the user as determined in step 306. For example, if the user tilts their head at an angle of ten degrees, then text displayed by the computing device might be tilted at a corresponding angle, such that the user is more easily able to read the text. Though the display screen of the computing device might be rectangular, the one or more display elements need not be rotated at ninety-degree angles. For example, an element might be rotated five degrees in order to match a slight five-degree head tilt of a user.

Figure 4A:
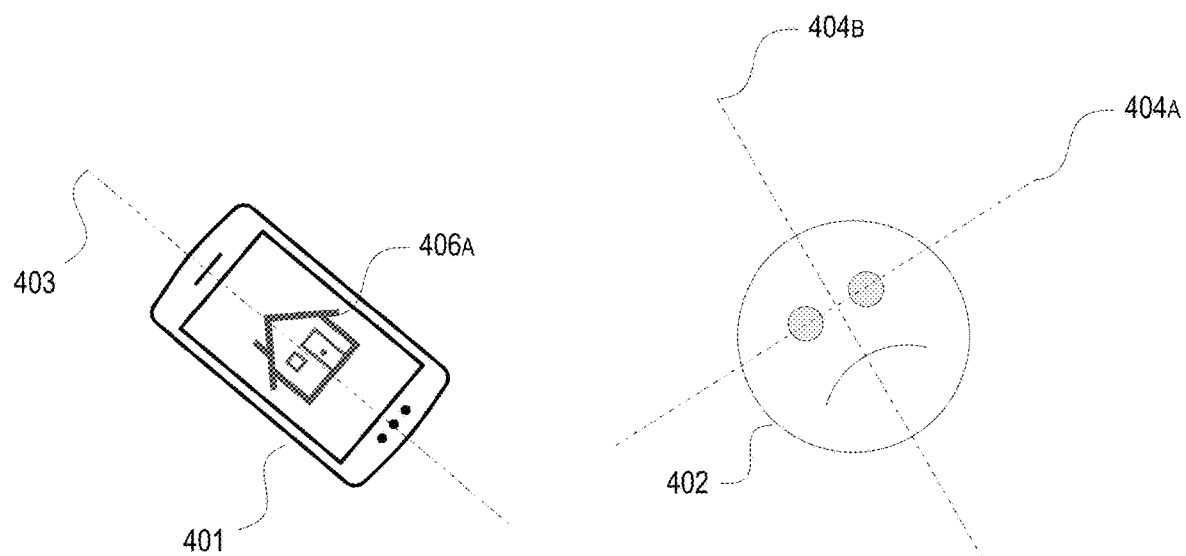
FIG. 4A depicts lines indicating a tilt of a computing device and a tilt of a user.
Figure 4B:
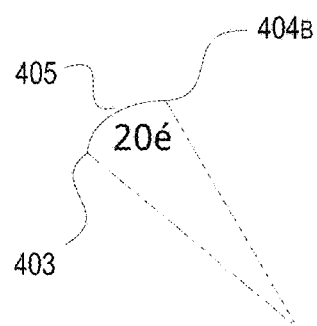
FIG. 4B depicts lines indicating the calculation of an angle of difference between the tilt of a computing device and the tilt of a user.
Figure 4C:
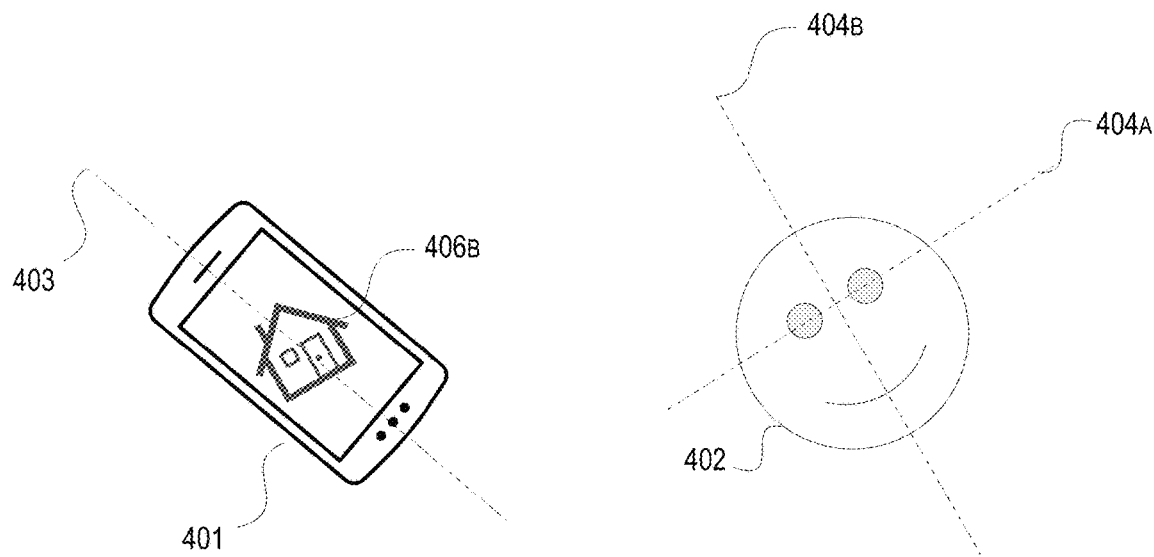
FIG. 4C depicts a display element rotated based on the angle of difference between the tilt of a computing device and the tilt of a user.

FIGS. 4A-4C illustrate various stages of the method 300 of FIG. 3. FIG. 4A shows a computing device 401 and displaying content 406a. The user 402 is tilted at a first angle, as represented by a first line 404a and a second line 404b. The computing device 401 is tilted at a second, different angle, as represented by the third line 403.

The lines shown in FIG. 4A, such as the first line 404a, the second line 404b, and the third line 403, might be generated as part of step 306 of FIG. 3. For example, the angle of the eyes might be determined with use of the one or more images captured in step 304, to determine coordinates of the eyes of the user, then drawing a line (e.g., the first line 404a) between those two coordinates. The second line 404b might then be determined by generating a line perpendicular to the first line 404a. In this manner, the second line 404b might be compared to the third line 403, which might represent the orientation of the computing device 401.

FIG. 4B depicts a comparison of the second line 404b and the third line 403, which identifies an angle 405 that represents the angle of the eyes of the user with respect to the computing device. In the examples provided by FIGS. 4A-4C, the angle 405 is twenty degrees. In other words, the tilt of the user 402 differs from the tilt of the computing device 401 by twenty degrees.

FIG. 4C depicts a similar circumstance as compared to FIG. 4A, except that the computing device 401 now displays content 406b that, relative to the content 406a, has been rotated based on the angle 405. In other words, based on the tilt of the user 402 differing from the tilt of the computing device 401, the content 406b has been tilted or otherwise adjusted by twenty degrees. Such a process may represent the result of steps 307 and 308 of FIG. 3.

Figure 5:
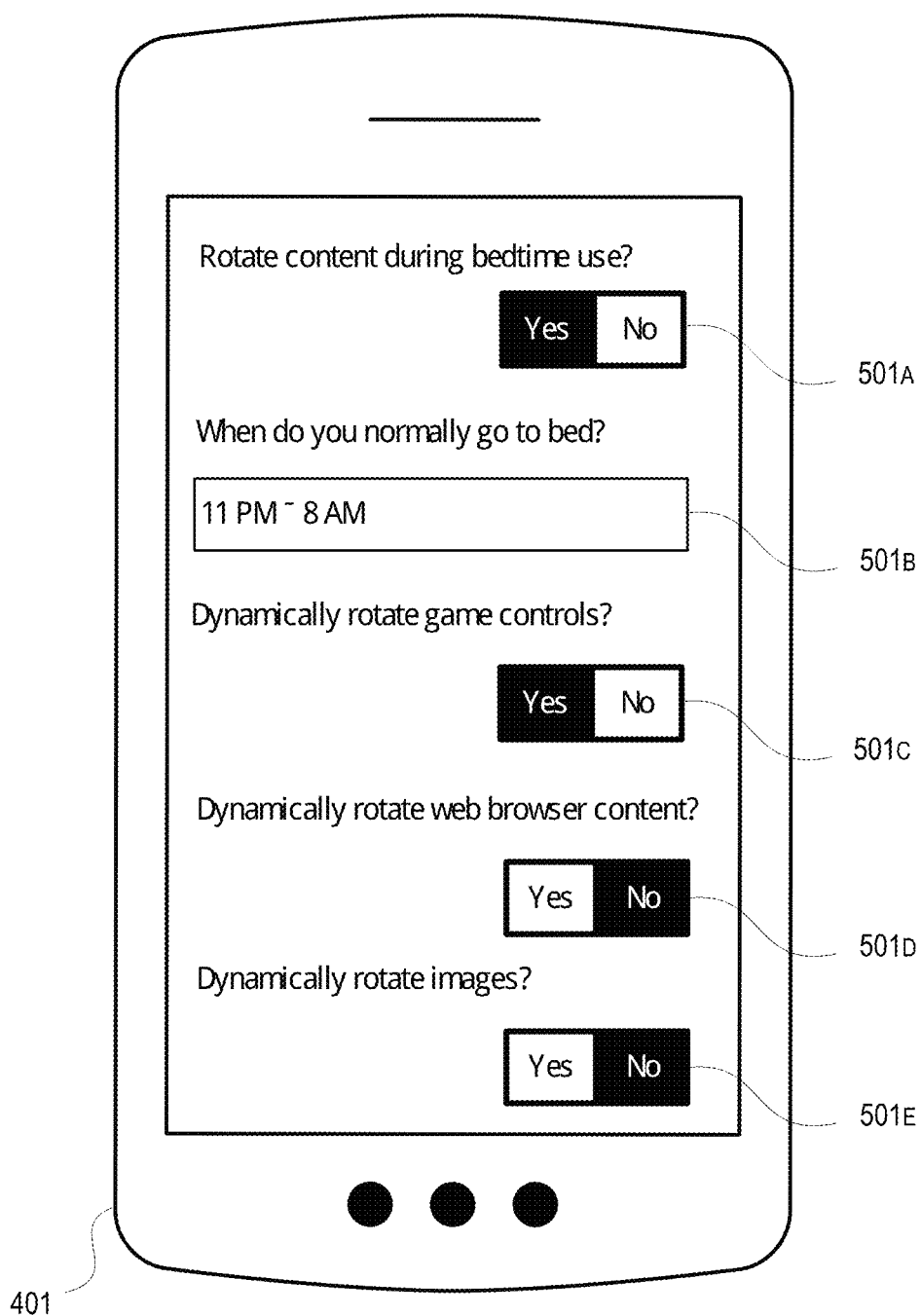
FIG. 5 depicts a set of illustrative user options for element rotation.

FIG. 5 shows an illustrative user interface on the computing device 401. The user interface provides a number of illustrative user options 501a-501e relating to rotation of a display content or individual elements thereof on the computing device 401.

User option 501a relates to whether a display of content or individual elements thereof should be rotated during bedtime use. As part of determining whether to rotate the display or one or more elements of the display (e.g., as part of step 307 of FIG. 3), the system may determine whether it is likely that the user is likely to be laying down (e.g., resting and/or relaxing on the couch, on a bed, or the like). Such a determination may be based on a time of day: for example, the user might be more likely to be laying down at night than during the day. Accordingly, the user option 501a permits a user to indicate whether or not steps, such as those described as part of the method 300 of FIG. 3, should be performed during times of day associated with bedtime use. In some circumstances, such a setting might prevent the method 300 of FIG. 3 from being performed in the daytime. That said a determination as to whether a user is likely to be laying down might be made based on other factors, such as the user's usage pattern of the computing device 401. For example, if a user usually uses certain applications before going to bed, then the use of those applications might indicate that the user is laying down (or likely to lay down soon).

User option 501*b* permits a user to provide an indication as to when they normally go to bed. Similar to the user option 501*a*, this option might permit the system to determine when it is likely that the user is resting or relaxing, and to decide whether to rotate one or more display elements (e.g., as part of step 307 of FIG. 3) partially on that basis.

User option 501*c* permits a user to indicate whether to rotate a display of content or individual elements thereof for a particular application. For example, many gaming applications configured for computing devices include virtual controls (e.g., virtual buttons or joysticks, often partially transparent and overlaid on top of gameplay content). These controls might ordinarily be placed on one of the corners of the screen of the computing device. That said, in circumstances where the user rotates the perspective of the device, it might be desirable to similarly rotate and/or otherwise shift the positioning of such controls. Shifting controls allows the user's hands to interact with such elements of the display in a more ergonomic and comfortable fashion while other content of the display is oriented for ease of sight. Accordingly, as part of determining whether to rotate one or more display elements (e.g., as part of step 307 of FIG. 3) that correspond to gameplay controls, the system may determine whether the user has responded affirmatively to the user option 501*c*.

The user option 501*c* is an example, and a user might be capable of determining whether many other interface elements of many other types of applications may be rotated. For example, a user might indicate whether an interface (e.g., a play button, a stop button) for a video player application should be rotated or should stay still. As another example, a user might indicate whether an interface (e.g., a next page button) for an e-book reader application should be rotated or should stay still.

User option 501*d* permits a user to indicate whether content of a given application (e.g., a web browser) should be rotated. For example, as part of determining whether to rotate one or more display elements (e.g., as part of step 307 of FIG. 3) in a web browser application, the system may determine whether the user has responded affirmatively to user option 501*d*. In this manner, the user might choose whether certain content (e.g., text) should be rotated if they tilt their head while reading it. More broadly, a user might set a number of different preferences for rotation, the preferences being application across different applications. For example, a user might allow content in a web browser to rotate (e.g., as part of step 308 of FIG. 3), but prevent content in an e-mail application from rotating.

User option 501*e* permits a user to indicate whether particular elements (e.g., images) of an application are to be adjusted according to the position of the user relative to the computing device. For example, as part of determining whether to rotate one or more display elements (e.g., as part of step 307 of FIG. 3) in a web browser application, the system may determine whether the user has responded affirmatively to user option 501*e*, and whether the one or more elements in question are an image displayed by the web browser application. In this manner, the user might choose whether certain particular elements of an application should be rotated. More broadly, a user might provide very nuanced indications of which types of content should be rotated: for example, a user might prefer that background images be rotated, but not other types of images.

Figure 6:
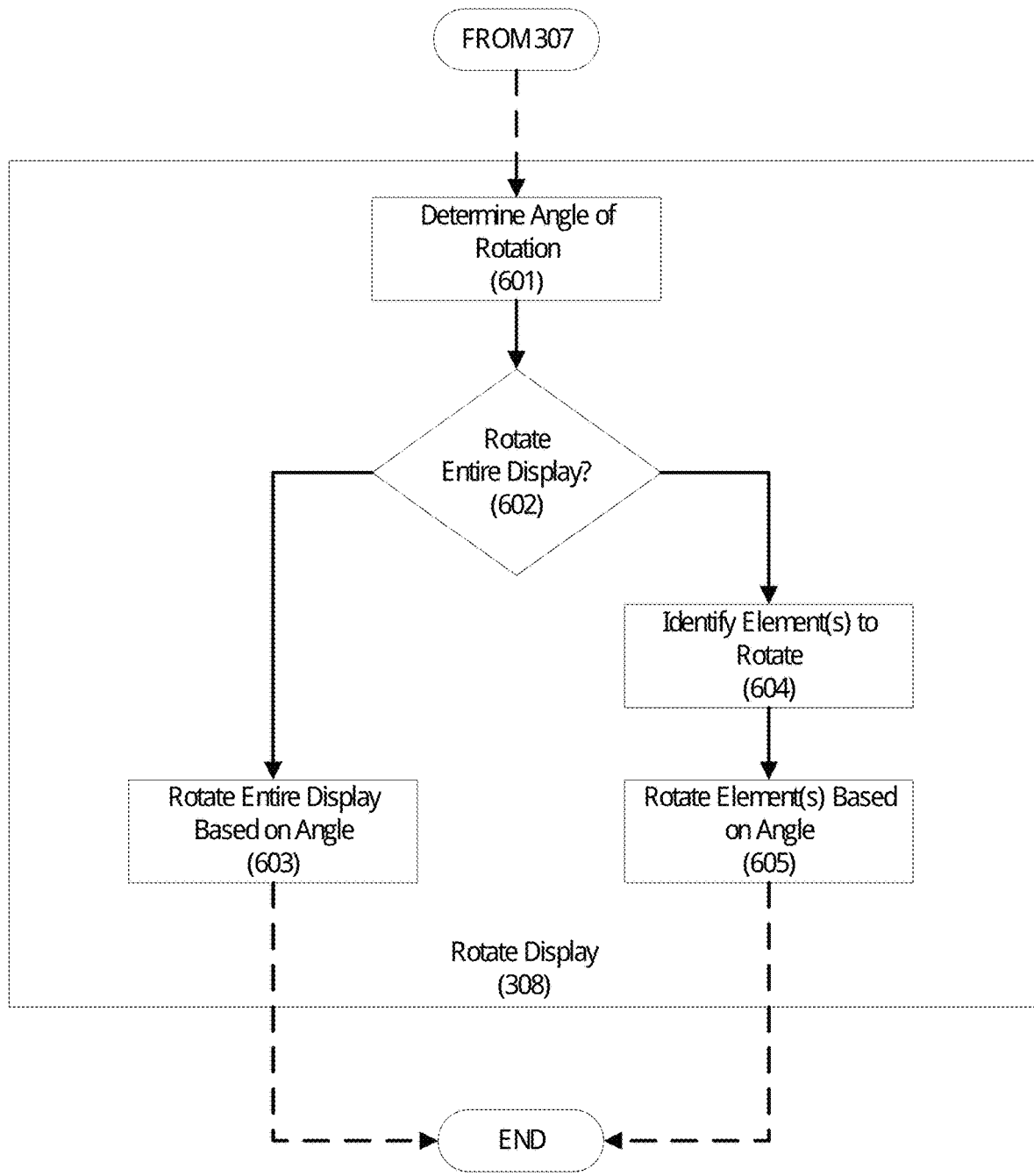
FIG. 6 depicts a flowchart for rotating a display and/or display elements thereof.

FIG. 6 depicts various steps which might be performed as part of step 308 of FIG. 3, which relates to rotating the display. As indicated above, rotating display as part of step 308 of FIG. 3 might comprise rotating all elements shown on a display (e.g., the entire display) and/or one or more display elements shown on the display (e.g., user interface elements, images, text, or the like). As such, the steps depicted in FIG. 6 illustrate the decision as to whether to rotate all of a display or a portion thereof (e.g., one or more display elements on the display).

In step 601, which follows from step 307 of FIG. 3, the computing device might determine an angle of rotation. The angle of rotation might be an angle corresponding to a difference between an angle of a first line perpendicular to a user's eyes and a line corresponding to the orientation of a computing device. Such a line might be generated in a manner similar to as depicted in FIGS. 4A-4C. As such, the angle might correspond to a degree to which an entire display, or display elements thereof, should be rotated.

In step 602, the computing device determines whether to rotate the entire display. The decision to rotate the entire display or not might be dependent on user preferences, application settings, or the like. For example, a user might specify that the entire display should rotate when the user is using a web browser application, but that only certain display elements of the display should be rotated when the user is using a media player application. As another example, an e-book reader might be configured to always cause the entire display to rotate, whereas an image browser application might be configured where only a displayed image (and not, e.g., other user interface elements) is rotated. If the answer to step 602 is yes, the flowchart proceeds to step 603. Otherwise, the flowchart proceeds to step 604.

In step 603, if the entire display is to be rotated, the entire display might be rotated based on the angle determined in step 601. This might comprise rotating all content displayed on the screen. In some instances, because a display device of a computing device might be rectangular, portions of the content might be occluded or otherwise hidden as a result of rotation. Accordingly, the displayed content might be scaled (e.g., shrunk down) such that it appears entirely on a display screen of a computing device.

In step 604, if the entire display is not to be rotated, one or more display elements might be identified for rotation. The identification of which display elements are configured to rotate might be based on user preferences, application preferences, or the like. For example, user interface elements (e.g., buttons) for an application might be configured to rotate, but not background elements (e.g., a repeating background image). As another example, a video (e.g., being played by a media player application) might be rotated, but other user interface elements (e.g., the play button, the pause button) might not.

In step 605, the elements identified in step 604 might be rotated based on the angle determined in step 601. In this manner, portions of content displayed by a computing device might be rotated, whereas other portions of the content displayed by the computing device might not.

Whether as part of step 603 or as part of step 605, rotation might comprise rotating the display, and/or one or more display elements of the display, based on one or more predetermined angles. For example, even if a user has tilted their head at thirty-five degrees, a display element or the entire display might be rotated at forty-five degrees. This may be performed for a number of reasons: for the purposes of better interface display/scaling, to avoid certain elements from being rotated at overly specific angles, or the like. In certain circumstances, if the angle of the eyes of the user with respect to the orientation of the computing device is sufficiently close to ninety degrees (e.g., is eighty-five degrees), then the computing device might switch display of an application from a portrait mode to a landscape mode, or vice versa. As such, depending on the angle of the eyes of the user with respect to the orientation of the computing device, either a subset of display elements might be rotated, or all display elements might be rotated.

FIG. 7A, FIG. 7B, FIG. 7C, and FIG. 7D depict various examples of how an entire display screen, or display elements thereof, might be rotated in accordance with the steps described in FIG. 6.

Figure 7A:
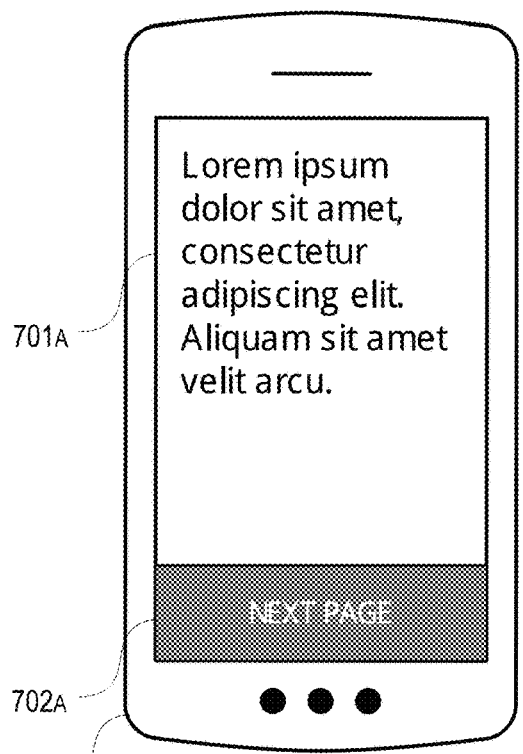
FIG. 7A depicts a computing device executing an e-reader application.
Figure 7B:
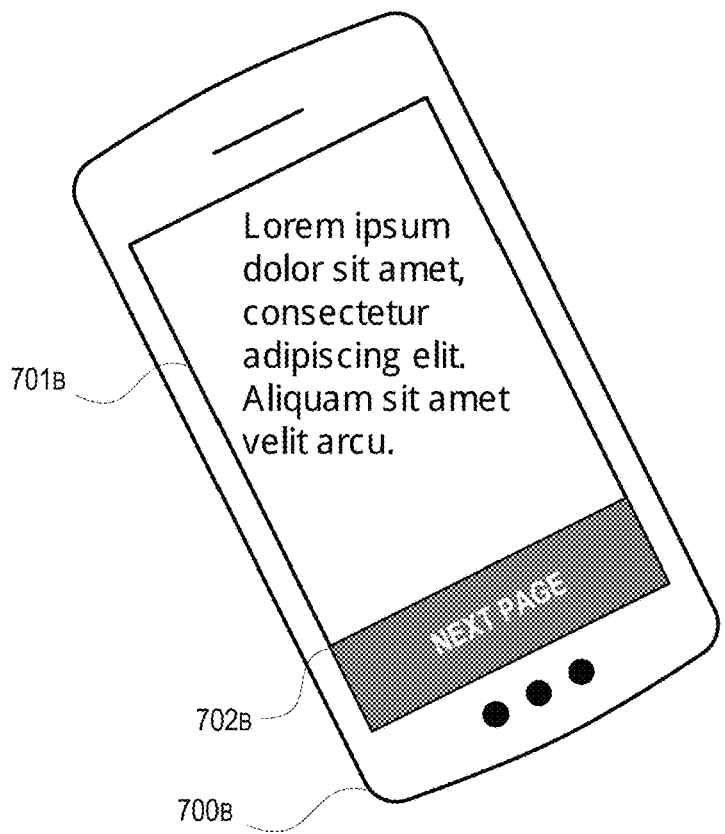
FIG. 7B depicts a slightly tilted computing device executing an e-reader application, with a display element of the e-reader application rotated.
Figure 7C:
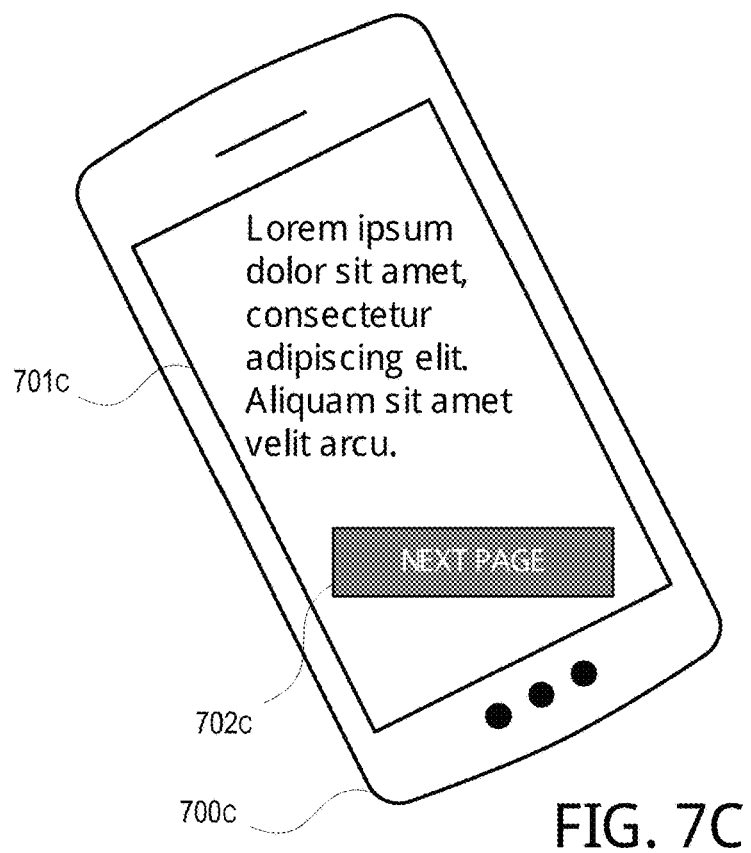
FIG. 7C depicts a slightly tilted computing device executing an e-reader application, with all display elements of the e-reader application rotated.
Figure 7D:
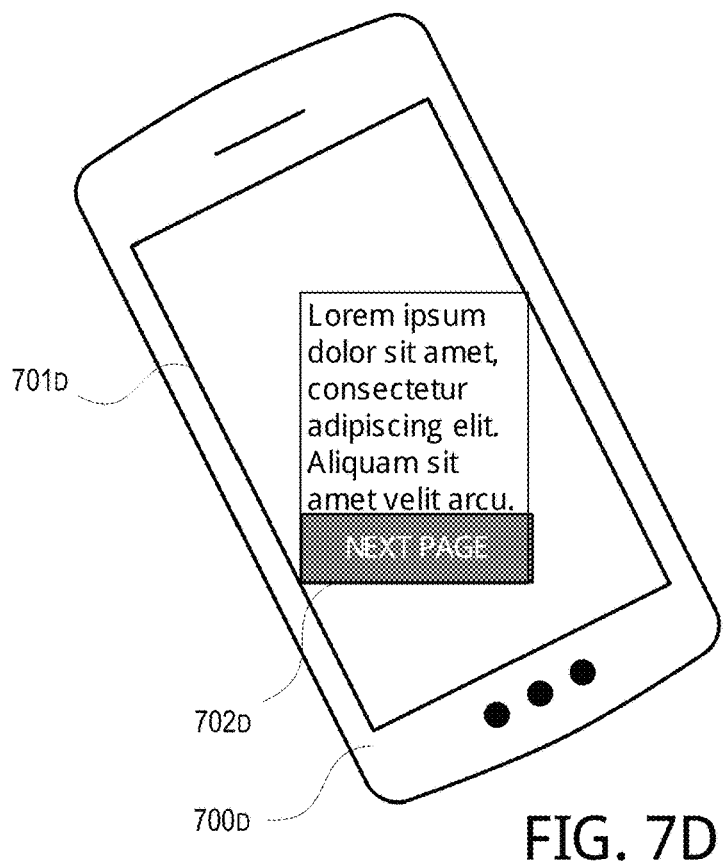
FIG. 7D depicts a slightly tilted computing device executing an e-reader application, with all the entire display of the computing device rotated.

FIG. 7A depicts a computing device 700a in a portrait orientation and executing an e-reader application comprising a text field 701a and a next page button 702a. FIG. 7B depicts a computing device 700b, executing the same e-reader application, slightly tilted such that a text field 701b has been rotated, but not a next page button 702b. This sort of configuration might occur as the result of steps 604 and 605 of FIG. 6: for example, user preferences and/or application preferences for the e-reader application might specify that the text field 701b should be rotated, but not the next page button 702b. FIG. 7C depicts a computing device 700c, executing the same e-reader application, slightly tilted such that both a text field 701c and a next page button 702c have been rotated. This might depict the circumstance discussed with respect to step 603 of FIG. 6, where the entire display may be rotated. FIG. 7D represents a variation of this concept: it depicts a computing device 700d, executing the same e-reader application, but in a bounding box comprising a text field 701d and a next page button 702d. This bounding box approach might be used where, for example, the application is not configured to individually rotate all display elements (e.g., as shown in FIG. 7C).

In the examples shown in FIG. 7B, FIG. 7C, and FIG. 7D, various aspects of the display have been resized to fit the screen of a computing device. As part of rotating a display or a display element thereof, the display and/or display element might be resized, scaled, and/or otherwise modified. For example, FIG. 7D shows all elements being shrunk to preserve a portrait orientation despite the rotation of the computing device 700d. As another example, the size of the next page button 702c has slightly shrunk relative to the size of the next page button 702c to better fit on the screen.

The following paragraphs (M1) through (M8) describe examples of methods that may be implemented in accordance with the present disclosure.

(M1) A method comprising capturing, by a computing device, at least one image of a user of the computing device with use of an image capture device of the computing device; determining, based on the at least one image, an angle of eyes of the user with respect to the computing device; and rotating, by the computing device, at least one element of content displayed by the computing device based on the determined angle, so as to allow for display of that element in an orientation consumable by the user.

(M2) A method may be performed as described in paragraph (M1) wherein capturing the at least one image of the user of the computing device is responsive to initiation of an application accessible via the computing device.

(M3) A method may be performed as described in paragraph (M1) wherein rotating the at least one element comprises causing the computing device to display an application in one of: a portrait mode, or a landscape mode.

(M4) A method may be performed as described in paragraph (M1) further comprising: sending, via an operating system of the computing device, a request for permission to capture the at least one image of the user, wherein capturing the at least one image is based on a user response to the request.

(M5) A method may be performed as described in paragraph (M1) wherein rotating the at least one element comprises rotating the at least one element less than 45 degrees.

(M6) A method may be performed as described in paragraph (M1) further comprising: receiving, via one or more sensors of the computing device, a data about an orientation of the computing device, wherein rotating the at least one element is further based on that data.

(M7) A method may be performed as described in paragraph (M1) wherein determining the angle of the eyes of the user comprises: determining a first line representing a relationship of a first eye of the user and a second eye of the user; determining a second line representing orientation of the computing device; and comparing the first line and the second line.

(M8) A method may be performed as described in paragraph (M1) wherein capturing the at least one image of the user comprises capturing a plurality of images of the user, and wherein determining the angle of the eyes of the user comprises: comparing each of the plurality of images of the user to determine an average angle of the eyes of the user.

The following paragraphs (A1) through (A8) describe examples of apparatuses that may be implemented in accordance with the present disclosure.

(A1) A computing device comprising: one or more processors; and memory storing instructions that, when executed by the one or more processors, cause the computing device to: capture at least one image of a user of the computing device with use of an image capture device of the computing device; determine, based on the at least one image, an angle of eyes of the user with respect to the computing device; and rotate at least one element of content displayed by the computing device based on the determined angle, so as to allow for display of that element in an orientation consumable by the user.

(A2) The computing device described in paragraph (A1) wherein the instructions, when executed by the one or more processors, cause the computing device to capture the at least one image of the user of the computing device responsive to initiation of an application accessible via the computing device.

(A3) The computing device described in paragraph (A1) wherein the instructions, when executed by the one or more processors, cause the computing device to rotate the at least one element by causing the computing device to display an application in one of: a portrait mode, or a landscape mode.

(A4) The computing device described in paragraph (A1) wherein the instructions, when executed by the one or more processors, further cause the computing device to: send, via an operating system of the computing device, a request for permission to capture the at least one image of the user, wherein capturing the at least one image is based on a user response to the request.

(A5) The computing device described in paragraph (A1) wherein the instructions, when executed by the one or more processors, cause the computing device to rotate the at least one element by rotating the at least one element less than 45 degrees.

(A6) The computing device described in paragraph (A1) wherein the instructions, when executed by the one or more processors, further cause the computing device to: receive, via one or more sensors of the computing device, a data about an orientation of the computing device, wherein rotating the at least one element is further based on that data.

(A7) The computing device described in paragraph (A1) wherein the instructions, when executed by the one or more processors, further cause the computing device to determine the angle of the eyes of the user by causing the computing device to: determine a first line representing a relationship of a first eye of the user and a second eye of the user; determine a second line representing orientation of the computing device; and compare the first line and the second line.

(A8) The computing device described in paragraph (A1) wherein capturing the at least one image of the user comprises capturing a plurality of images of the user, and wherein determining the angle of the eyes of the user comprises: comparing each of the plurality of images of the user to determine an average angle of the eyes of the user.

The following paragraphs (CRM1) through (CRM8) describe examples of computer-readable media that may be implemented in accordance with the present disclosure.

(CRM1) One or more non-transitory computer-readable media storing instructions that, when executed by one or more processors, cause a computing device to: capture at least one image of a user of the computing device with use of an image capture device of the computing device; determine, based on the at least one image, an angle of eyes of the user with respect to the computing device; and rotate at least one element of content displayed by the computing device based on the determined angle, so as to allow for display of that element in an orientation consumable by the user.

(CRM2) The non-transitory computer-readable media described in paragraph (CRM1) wherein the instructions, when executed by the one or more processors, cause the computing device to capture the at least one image of the user of the computing device responsive to initiation of an application accessible via the computing device.

(CRM3) The non-transitory computer-readable media described in paragraph (CRM1) wherein the instructions, when executed by the one or more processors, cause the computing device to rotate the at least one element by causing the computing device to display an application in one of: a portrait mode, or a landscape mode.

(CRM4) The non-transitory computer-readable media described in paragraph (CRM1) wherein the instructions, when executed by the one or more processors, further cause the computing device to: send, via an operating system of the computing device, a request for permission to capture the at least one image of the user, wherein capturing the at least one image is based on a user response to the request.

(CRM5) The non-transitory computer-readable media described in paragraph (CRM1) wherein the instructions, when executed by the one or more processors, cause the computing device to rotate the at least one element by rotating the at least one element less than 45 degrees.

(CRM6) The non-transitory computer-readable media described in paragraph (CRM1) wherein the instructions, when executed, further cause the computing device to: receive, via one or more sensors of the computing device, a data about an orientation of the computing device, wherein rotating the at least one element is further based on that data.

(CRM7) The non-transitory computer-readable media described in paragraph (CRM1) wherein the instructions, when executed, further cause the computing device to determine the angle of the eyes of the user by causing the computing device to: determine a first line representing a relationship of a first eye of the user and a second eye of the user; determine a second line representing orientation of the computing device; and compare the first line and the second line.

(CRM8) The non-transitory computer-readable media described in paragraph (CRM1) wherein capturing the at least one image of the user comprises capturing a plurality of images of the user, and wherein determining the angle of the eyes of the user comprises: comparing each of the plurality of images of the user to determine an average angle of the eyes of the user.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    capturing, by a computing device, at least one image of a user of the computing device with use of an image capture device of the computing device;
    determining, based on the at least one image, an angle of eyes of the user with respect to the computing device; and
    rotating, by the computing device, at least one element of content displayed by the computing device based on the determined angle, upon satisfying a threshold, so as to allow for display of that element in an orientation consumable by the user,
    wherein capturing the at least one image of the user comprises capturing a plurality of images of the user, and
    wherein determining the angle of the eyes of the user comprises:
        comparing each of the plurality of images of the user to determine an average angle of the eyes of the user.

2. The method of claim 1, wherein capturing the at least one image of the user of the computing device is responsive to initiation of an application accessible via the computing device.

3. The method of claim 1, wherein rotating the at least one element comprises causing the computing device to display an application in one of: a portrait mode, or a landscape mode.

4. The method of claim 1, further comprising:
    sending, via an operating system of the computing device, a request for permission to capture the at least one image of the user, wherein capturing the at least one image is based on a user response to the request.

5. The method of claim 1, wherein rotating the at least one element comprises rotating the at least one element less than 45 degrees.

6. The method of claim 1, further comprising:
    receiving, via one or more sensors of the computing device, a data about an orientation of the computing device, wherein rotating the at least one element is further based on that data.

7. The method of claim 1, wherein determining the angle of the eyes of the user comprises:
    determining a first line representing a relationship of a first eye of the user and a second eye of the user;
    determining a second line representing orientation of the computing device; and comparing each of the plurality of images of the user to determine an average angle of the eyes of the user.

8. A computing device comprising:
one or more processors; and
memory storing instructions that, when executed by the one or more processors, cause the computing device to:
capture at least one image of a user of the computing device with use of an image capture device of the computing device;
determine, based on the at least one image, an angle of eyes of the user with respect to the computing device; and
rotate, by the computing device, at least one element of content displayed by the computing device based on the determined angle, upon satisfying a threshold, so as to allow for display of that element in an orientation consumable by the user,
wherein capturing the at least one image of the user comprises capturing a plurality of images of the user, and
wherein determining the angle of the eyes of the user comprises:
comparing each of the plurality of images of the user to determine an average angle of the eyes of the user.

9. The computing device of claim 8, wherein the instructions, when executed by the one or more processors, cause the computing device to capture the at least one image of the user of the computing device responsive to initiation of an application accessible via the computing device.

10. The computing device of claim 8, wherein the instructions, when executed by the one or more processors, cause the computing device to rotate the at least one element by causing the computing device to display an application in one of: a portrait mode, or a landscape mode.

11. The computing device of claim 8, wherein the instructions, when executed by the one or more processors, further cause the computing device to:
send, via an operating system of the computing device, a request for permission to capture the at least one image of the user, wherein capturing the at least one image is based on a user response to the request.

12. The computing device of claim 8, wherein the instructions, when executed by the one or more processors, cause the computing device to rotate the at least one element by rotating the at least one element less than 45 degrees.

13. The computing device of claim 8, wherein the instructions, when executed by the one or more processors, further cause the computing device to:
receive, via one or more sensors of the computing device, a data about an orientation of the computing device, wherein rotating the at least one element is further based on that data.

14. The computing device of claim 8, wherein the instructions, when executed by the one or more processors, further cause the computing device to determine the angle of the eyes of the user by causing the computing device to:
determine a first line representing a relationship of a first eye of the user and a second eye of the user;
determine a second line representing orientation of the computing device; and
compare an angle of the first line and an angle of the second line.

15. One or more non-transitory computer-readable media storing instructions that, when executed by one or more processors, cause a computing device to:
capture at least one image of a user of the computing device with use of an image capture device of the computing device;
determine, based on the at least one image, an angle of eyes of the user with respect to the computing device; and
rotate, by the computing device, at least one element of content displayed by the computing device based on the determined angle, upon satisfying a threshold, so as to allow for display of that element in an orientation consumable by the user,
wherein capturing the at least one image of the user comprises capturing a plurality of images of the user, and
wherein determining the angle of the eyes of the user comprises:
comparing each of the plurality of images of the user to determine an average angle of the eyes of the user.

16. The computer-readable media of claim 15, wherein the instructions, when executed by the one or more processors, cause the computing device to capture the at least one image of the user of the computing device responsive to initiation of an application accessible via the computing device.

17. The computer-readable media of claim 15, wherein the instructions, when executed by the one or more processors, cause the computing device to rotate the at least one element by causing the computing device to display an application in one of: a portrait mode, or a landscape mode.

18. The computer-readable media of claim 15, wherein the instructions, when executed by the one or more processors, further cause the computing device to:
send, via an operating system of the computing device, a request for permission to capture the at least one image of the user, wherein capturing the at least one image is based on a user response to the request.

19. The computer-readable media of claim 15, wherein the instructions, when executed by the one or more processors, cause the computing device to rotate the at least one element by rotating the at least one element less than 45 degrees.

* * * * *